United States Patent [19]

Witte et al.

[11] Patent Number: 4,751,275

[45] Date of Patent: Jun. 14, 1988

[54] PROCESS AND CATALYST FOR THE PREPARATION OF SYNDIOTACTIC 1,2,-POLYBUTADIENE

[75] Inventors: Josef Witte, Colonge; Gerd Sylvester, Leverkusen; Bernd Stollfuss, Bergisch-Gladbach, all of Fed. Rep. of Germany

[73] Assignee: Bayer Akteingesellschaft, Leverkusen, Fed. Rep. of Germany

[21] Appl. No.: 919,707

[22] Filed: Oct. 16, 1986

[30] Foreign Application Priority Data

Oct. 26, 1985 [DE] Fed. Rep. of Germany ....... 3538130

[51] Int. Cl.$^4$ ..................... C08F 4/60; C08F 136/06
[52] U.S. Cl. ..................... 526/139; 502/117; 502/121; 526/335; 526/903
[58] Field of Search ................. 502/117, 121; 526/139

[56] References Cited

U.S. PATENT DOCUMENTS

| | | | |
|---|---|---|---|
| 4,168,357 | 9/1979 | Throckmorton et al. | 526/139 |
| 4,168,374 | 9/1979 | Throckmorton et al. | 526/139 |

FOREIGN PATENT DOCUMENTS

| | | | |
|---|---|---|---|
| 48-6939 | 3/1973 | Japan | 526/139 |
| 926036 | 5/1963 | United Kingdom | 526/903 |

*Primary Examiner*—Edward J. Smith
*Attorney, Agent, or Firm*—Connolly & Hutz

[57] ABSTRACT

Syndiotactic 1,2-polybutadiene of high quality may be obtained in excellent yield by solution polymerization of butadiene-(1,3) in hydrocarbons, using organometallic mixed catalysts composed of trialkylaluminium, hydrocarbon-soluble chromium-III compounds and a dialkylphosphite corresponding to the formula t,0010 wherein R denotes straight chained or branched $C_1$–$C_8$-alkyl and $R_1$, $R_2$ and $R_3$ denote methyl or ethyl or R and $R_1$ together form a methylene group.

9 Claims, No Drawings

PROCESS AND CATALYST FOR THE PREPARATION OF SYNDIOTACTIC 1,2,-POLYBUTADIENE

Numerous coordination catalysts based on the transition metals, titanium, vanadium, chromium, molybdenum and cobalt have been described for the preparation of syndiotactic 1,2-polybutadiene. The majority of these catalyst systems, however, have insufficient activity or selectivity and in some cases cross-linked polymers unsuitable for technical use are produced. The following catalyst systems containing cobalt compounds have been used for the preparation of syndiotactic 1,2-polybutadiene on a technical scale:

1. Triisobutyl aluminium/water/cobalt dibromide/triphenyl phosphine and
2. triethylaluminium/water/cobalt-tris-acetylacetonate/carbon disulphide.

These catalysts also have serious disadvantages when used on a large technical scale. The first mentioned system can only develop sufficient catalytic activity for a technical process if used in chlorinated hydrocarbons as polymerisation medium but such chlorinated hydrocarbons are not only very difficult to remove quantitatively from the polymer but also generally give rise to problems of toxicity. The second catalyst system contains carbon disulphide as one of its components, which necessitates the use of special safety measures owing to its low boiling point and low ignition temperature. Moreover, the 1,2-polybutadienes produced with this catalyst have very high melting points (200° C.) and are therefore difficult to process.

Coordination catalysts based on chromium compounds such as triethylaluminium/chromium tris-acetyl acetonate have been known for a long time but they only have a low activity and give rise to polymers with very low molar masses and have therefore hitherto not been usable on a technical scale. Chromium catalysts containing a dialkylphosphite, e.g. dibutylphosphite, in addition to trialkylaluminium and a chromium-III compound are described in JP-A-7306939. These give rise to an extremely high molecular weight, only slightly crystalline 1,2-polybutadiene containing a proportion of gel.

It has now surprisingly been found that highly active catalysts for the preparation of syndiotactic 1,2-polybutadiene may be obtained on the basis of chromium-III compounds which are soluble in hydrocarbons, trialkylaluminium and dialkylphosphites if the dialkylphosphites used correspond to the general formula I

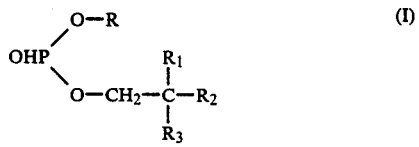

wherein
R denotes straight chained or branched $C_1$–$C_8$-alkyl,
$R_1$, $R_2$ and $R_3$ denote methyl or ethyl or
R and $R_1$ together form a methylene group.

Di-neopentylphosphite or neopentylmethylphosphite is preferably used. The hydrocarbon-soluble chromium-III compound used may be chromium-tris-acetylacetonate or preferably a chromium carboxylate such as chromium-III stearate, chromium-III octanoate or chromium-III versatate. The trialkylaluminium compounds used may contain, for example, $C_1$–$C_8$-alkyl groups. Triethylaluminium is preferably used. Small quantities of 1,2-butadiene may be introduced to regulate the molecular mass of the syndiotactic vinyl polybutadiene without reducing the catalyst activity. The quantity used is preferably 100 to 10,000 ppm, in particular 500 to 3000 ppm, based on the quantity of butadiene-(1,3).

Aromatic, cycloaliphatic or aliphatic hydrocarbons may be used as polymerisation medium, e.g. benzene, toluene, cyclohexane, methylcyclopentane or n-hexane. Instead of pure hydrocarbons, commercial mixtures of the above mentioned hydrocarbons may be used, e.g. mixtures of n-hexane, methylpentanes, dimethylbutanes and cycloalkanes.

The concentration of butadiene in the polymerisation reaction mixture may amount to 10 to 50% by weight. Butadiene concentrations of 15 to 25% by weight are particularly suitable for polymers in the range of molar masses which is of technical interest. Polymerization is carried out by the conventional technique of solution polymerisation under an inert protective gas such as nitrogen or argon. The polymerisation temperature may be chosen within the range of from 30° to 130° C. and is preferably in the range of from 35° to 65° C. The heat of polymerisation may be removed by external cooling, cooling by evaporation or a combination of the two methods.

The polymerisation process may be carried out continuously or batchwise and results in monomer conversions of over 90% within 0.5 to 4 hours, depending on the polymerisation temperature employed. After polymerisation has been terminated, the catalyst system is inactivated by the addition of H-acidic compounds such as alcohols or carboxylic acids.

When the polymerisation solutions have been stopped, antioxidants which do not discolour, e.g. 2.6-di-tert.-butyl-4-methylphenol, are added in quantities of 0.2 to 2% by weight, based on the polymer. The vinyl polybutadiene is isolated from the solution by precipitation with alcohols such as methanol, ethanol or isopropanol or by steam distillation of the solvent and is then dried. The product may also be separated from the solvent by using an evaporator screw and the extruded strand of polybutadiene may then be cut up in the form of cylinders after it has passed through a cooling apparatus.

The catalysts according to the invention may be produced in situ in the solvent-monomer mixture by addition of the catalyst components. The sequence in which the components are added is not critical but the components are preferably added in the sequence of aluminium trialkyl, chromium-III compound, phosphite. The catalysts may also be preformed or partly preformed. If they are to be preformed, aluminium trialkyl and the chromium-III compound are first reacted together in one of the above mentioned solvents in a quantity calculated to form a 0.005 to 0.01 molar solution, based on the quantity of chromium, and the phosphite is then added. The preformed catalyst attains its full activity after a few minutes. If the catalyst is to be partly preformed, a 0.01 to 1 molar solution of chronium-III compound and phosphite is prepared and then added to the mixture of butadiene and solvent before or after the addition of the aluminium trialkyl. The quantity of chromium-III compound is from 0.01 to 0.5 mmol per 100 g of butadiene, preferably from 0.05 to 0.1 mmol. The molar ratio of Al:Cr:P may be as 5–50:1:2–15 and is preferably in the range of 10–25:1:3–10. At least 70% but preferably 80 to 90% of the double bonds of the vinyl polybutadiene prepared according to the invention are vinyl double bonds. The polymers are completely gel-free and dissolve completely in toluene at 80° C.

The vinyl polybutadienes prepared according to the invention may be worked up into shaped articles such as shoe soles, boards or sheets. They may be cross-linked alone or as mixtures with rubbers such as natural rubber, styrene-butadiene rubber, cis-polybutadiene or ethylene-vinyl acetate copolymers, using sulphur accelerator systems or radical formers. Rubber articles prepared as described may also contain other auxiliary substances such as fillers (carbon black, silicates, chalk) and plasticizers.

EXAMPLE 1

1500 ml of cyclohexane ($H_2O$ content <3 ppm), 200 g of butadiene-(1,3) ($H_2O$ content <3 ppm) and 0.2 g of butadiene-(1,2) were introduced with exclusion of oxygen and water into a 3-litre glass autoclave equipped with stirrer and low temperature reflux condenser.

2.5 ml of a 1-molar triethylaluminium solution in cyclohexane were then added, followed by 1 ml of a 0.1-molar solution of chromium-III octanoate in cyclohexane and the mixture was heated to 30° C. 0.15 g of a dineopentyl phosphite (0.67 mmol) was then added. Polymerization started immediately, as could be seen from the rise in temperature. The reaction temperature was regulated by evaporation and occasional external cooling so that a temperature of 50° C. was obtained within about 30 minutes. This temperature was maintained for a further 1.5 hours. 1 g of 2.6-di-tert.-butyl-4-methylphenol dissolved in 20 ml of ethanol was then added and the reaction mixture was left to cool to 30° C. The polymer was precipitated with 3000 ml of ethanol and dried to constant weight under a vacuum at 50° C.

The yield was 189 g (94.5% of theoretical).

The proportions of double bonds in the polymer as determined by IR spectroscopy were as follows:

| Vinyl: | 92.8% |
|---|---|
| cis-1,4: | 5.7% |
| trans-1,4: | 1.5%. | viscosity number $[\eta] = 2.71$ dl/g, toluene, 80° C.

EXAMPLE 2

Example 1 was repeated but this time 0.22 g of dineopentylphosphite corresponding to 1.0 mmol was used.

The degree of conversion after 3 hours was 97.5%.

The micro structure of the polymer as determined by IR spectroscopy was as follows:

| Vinyl: | 93.5% |
|---|---|
| cis-1,4: | 5.7% |
| trans-1,4: | 0.8% |

Viscosity number $[\eta] = 2.73$ dl/g, toluene, 80° C.

EXAMPLES 3–6

Butadiene was polymerised by the method described in Example 1 with this difference that the dialkylphosphite used was methyl-neopentylphosphite corresponding to the formula

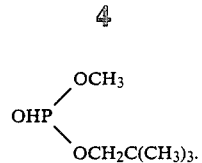

The experimental results are shown in Table 1.

TABLE 1

| | Example | | | |
|---|---|---|---|---|
| | 3 | 4 | 5 | 6 |
| Cyclohexane (ml) | 1500 | 1500 | 1500 | 1500 |
| Butadiene-(1,3) (g) | 200 | 200 | 200 | 200 |
| Butadiene-(1,2) (g) | 0.15 | 0.20 | 0.25 | 0.25 |
| $Al(C_2H_5)_3$ (mmol) | 5.0 | 2.5 | 2.5 | 2.5 |
| $Cr(oct)_3$ (mmol) | 0.2 | 0.15 | 0.1 | 0.1 |
| $OHP(OCH_3)OCH_2$—$C(CH_3)_3$ (mmol) | 2.0 | 1.5 | 1.0 | 0.8 |
| Conversion % | 100 | 96 | 99 | 97 |
| Vinyl % | 92.7 | 91.2 | 93.1 | 91.2 |
| cis-1,4 % | 7.3 | 8.3 | 6.9 | 7.8 |
| trans-1,4 % | — | 0.5 | — | 1.0 |
| $[\eta]$ dl/g, toluene, 80° C. | 3.30 | 2.89 | 2.50 | 2.67 |

EXAMPLE 7

1500 ml of toluene ($H_2O$ content <3 ppm), 200 g of butadiene-(1,3) ($H_2O$ content <3 ppm) and 0.15 g of butadiene-(1,2) were introduced with exclusion of water and oxygen into a 3 l glass autoclave equipped with stirrer and low temperature reflux condenser.

5 ml of a 1 molar solution of triethylaluminium in toluene were then added, followed by 2 ml of a 0.1 molar solution of chromium-III-octanoate. The reaction mixture was heated to 30° C. and 1.5 mmol of 2-oxo-(2H)-5,5-dimethyl-1,3,2-dioxaphosphorinane dissolved in 3 ml of toluene were added. Polymerization started at once. The polymerisation temperature was maintained at 30° to 45° C. by evaporation cooling and external cooling. 1 g of 2,6-di-tert.-butyl-4-methylphenol dissolved in 20 ml of ethanol was added after 3 hours. After cooling to 35° C., the polymer was precipitated from the solution with 3000 ml of ethanol and dried to constant weight under a vacuum at 50° C. The yield was 187 g = 93.5% of theoretical. The proportions of double bonds as determined by IR spectroscopy were as follows:

| Vinyl | = | 81.4% |
|---|---|---|
| cis-1,4 | = | 18.6% |
| trans-1,4 | | — |

Viscosity number $[\eta] = 2.25$ dl/g, toluene, 80° C.

EXAMPLES 8 TO 12 (COMPARISON EXPERIMENTS)

The comparison experiments with dimethylphosphite and di-n-butylphosphite indicated in Table 2 were carried out as described in example 1.

TABLE 2

| | Example | | | | |
|---|---|---|---|---|---|
| | 8 | 9 | 10 | 11 | 12 |
| Toluene (ml) | 600 | 1500 | — | — | — |
| Cyclohexane (ml) | — | — | 1500 | 1500 | 1500 |
| Butadiene-(1,3) (g) | 200 | 200 | 200 | 200 | 200 |
| Butadiene-(1,2) (g) | — | 0.1 | 0.2 | 0.2 | 0.2 |
| $Al(C_2H_5)_3$ (mmol) | — | 5 | 2.5 | 5.0 | 10.0 |
| $Al(iC_4H_9)_3$ (mmol) | 5 | — | — | — | — |
| Cr(acetyl acetonate)$_3$ (mmol) | 0.83 | — | — | — | — |

TABLE 2-continued

| | Example | | | | |
|---|---|---|---|---|---|
| | 8 | 9 | 10 | 11 | 12 |
| Cr(oct)$_3$ (mmol) | — | 0.2 | 0.1 | 0.2 | 1.0 |
| (CH$_3$O)$_2$PHO (mmol) | — | — | 0.67 | 0.67 | — |
| (C$_4$H$_9$O)$_2$PHO (mmol) | 0.3 | 0.5 | — | — | 0.5 |
| Conversion % after 3 h, 50° C. | 74 | 64 | 0 | 63 | 85 |
| Vinyl % | 88.5 | 88.2 | — | 89.2 | 86.5 |
| cis-1,4 % | 11.5 | 11.8 | — | 10.8 | 13.5 |
| trans-1,4 % | — | — | — | — | — |
| [η] dl/g, toluene, 80° C. | 13.2* | 4.04 | — | 2.75 | 2.87 |

*containing gel

These comparison experiments demonstrate very clearly the substantially higher activity of the catalyst system according to the invention used in Example 1 compared with the state of the art catalysts.

A comparably high conversion of butadiene to syndiotactic 1,2-polybutadiene is not obtained until 10 times the quantity of chromium-III-octanoate and much increased quantities of other catalyst components are used (Comparison Example 12).

No polymerisation occurs when catalyst is used in a quantity corresponding to Example 1 (Comparison Experiment 10).

We claim:

1. Process for the preparation of syndiotactic 1,2-polybutadiene by solution polymerisation of butadiene-(1,3) in hydrocarbons, using organometallic mixed catalysts of trialkylaluminium, chromium-III compounds which are soluble in hydrocarbons, and dialkylphosphites, characterised in that the dialkylphosphites used correspond to the general formula (I)

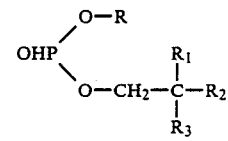

wherein
R denotes straight chained or branched C$_1$-C$_8$-alkyl and R$_1$, R$_2$ and R$_3$ denote methyl or ethyl.

2. Process according to claim 1, characterised in that polymerisation is carried out in the presence of from 100 to 10,000 ppm of butadiene-(1,2), based on the quantity of butadiene-(1,3) put into the process.

3. Process according to claim 1, characterised in that polymerisation is carried out under an inert protective gas at 30° to 130° C.

4. A process according to claim 1, wherein the polymerisation is carried out in the presence of from 500 to 3,000 ppm of butadiene-(1,2).

5. Catalyst based on trialkylaluminium, a hydrocarbon-soluble chromium-III compound and dialkylphosphite, characterised in that the dialkylphosphite is di-neopentylphosphite or neopentylmethylphosphite.

6. Catalyst according to claim 5 characterised in that the dialkylphosphite is di-neopentylphosphite.

7. Catalyst according to claim 5 consisting of (a) triethylaluminium, (b) chromium-III-stearate, -octanoate or -versatate and (c) di-neopentylphosphite.

8. Catalyst according to claim 5 in which the molar ratio of aluminium compound to chromium-III compound to phosphite is in the range of 5–50:1:2–15.

9. A catalyst according to claim 5, wherein the molar ratio of aluminum compound to chromium III compound to phosphite is in the range of 10–25:1:3–10.

* * * * *

UNITED STATES PATENT AND TRADEMARK OFFICE
CERTIFICATE OF CORRECTION

PATENT NO. : 4,751,275
DATED : June 14, 1988
INVENTOR(S) : Witte et al.

It is certified that error appears in the above-identified patent and that said Letters Patent is hereby corrected as shown below:

On title page, item 73 should read:

"Assignee: Bunawerke Huls GMBH, Marl, Federal Republic of Germany".

Signed and Sealed this

Fourteenth Day of November, 1989

Attest:

JEFFREY M. SAMUELS

*Attesting Officer*  *Acting Commissioner of Patents and Trademarks*